United States Patent [19]

Duling et al.

[11] 3,954,927

[45] May 4, 1976

[54] METHOD OF MAKING POROUS OBJECTS OF ULTRA HIGH MOLECULAR WEIGHT POLYETHYLENE

[75] Inventors: Irl N. Duling, West Chester; John C. Merges, Jr., Glen Mills, both of Pa.

[73] Assignee: Sun Ventures, Inc., St. Davids, Pa.

[22] Filed: Aug. 16, 1974

[21] Appl. No.: 497,603

Related U.S. Application Data

[63] Continuation-in-part of Ser. No. 329,512, Feb. 5, 1973, abandoned, which is a continuation-in-part of Ser. No. 885,355, Dec. 15, 1969, abandoned, which is a continuation-in-part of Ser. No. 745,884, July 18, 1968, abandoned.

[52] U.S. Cl. ............................. 264/49; 260/2.5 M; 264/211
[51] Int. Cl.² ........................................ B29D 27/00
[58] Field of Search ............ 264/49, 211; 260/2.5 M

[56] References Cited
UNITED STATES PATENTS

| | | | |
|---|---|---|---|
| 3,536,796 | 10/1970 | Rock | 264/49 |
| 3,607,793 | 9/1971 | Mahlman | 260/93.7 X |

FOREIGN PATENTS OR APPLICATIONS

| | | | |
|---|---|---|---|
| 1,044,028 | 9/1966 | United Kingdom | 264/49 |

*Primary Examiner*—Philip Anderson
*Attorney, Agent, or Firm*—J. Edward Hess; Donald R. Johnson; Anthony Potts, Jr.

[57] ABSTRACT

A method is disclosed for preparing a porous structure of ultra high molecular weight polyethylene. A heterogeneous composite of the polyethylene and a particular hydrocarbon is heated to a temperature above the melting point of the hydrocarbon but below the melting point of the polyethylene. The composite is then shaped. After such shaping the temperature is then raised to a temperature above the melting point of the polyethylene and maintained until complete fusion of the polyethylene particles occurs. Thereafter the hydrocarbon is extracted from the cooled shaped structure.

10 Claims, No Drawings

METHOD OF MAKING POROUS OBJECTS OF ULTRA HIGH MOLECULAR WEIGHT POLYETHYLENE

CROSS REFERENCE TO RELATED APPLICATIONS

This application is a continuation-in-part of copending application Ser. No. 329,512, filed Feb. 5, 1973 and now abandoned, which is a continuation-in-part of copending application Ser. No. 885,355, filed Dec. 15, 1969 (now abandoned), which itself was a continuation-in-part of a copending application Ser. No. 745,884, filed July 18, 1968 (now abandoned). The copending application Ser. No. 885,355 is related to two other continuation-in-part applications: Ser. No. 884,847, abandoned July 22, 1971, which relates to a method of preparing a polymer coated-wax impregnated cellulosic stock and Ser. No. 884,879, now U.S. Pat. No. 3,665,068, issued May 23, 1972, which relates to a method of extruding extremely high molecular weight polyolefins.

BACKGROUND OF THE INVENTION

This invention relates to a method for preparing a porous polyethylene object of desired shape. Said polyethylene has a molecular weight in excess of 1,000,000. A polyethylene with such a molecular weight is often referred to as an ultra high molecular weight polyethylene. The porous structure has many utilities depending on its shape, among them filter funnels, immersion filters, filter crucibles, porous sheets, etc.

This polyethylene has certain properties superior to a similar polyethylene with a lower molecular weight. These superior physical properties are: toughness, impact strength, abrasion resistance, antifriction, good performance at temperatures below freezing and excellent stability at temperature as high as 300°F. But because this polyethylene is extremely viscous above its melting point, it sustains substantial shear degradation if mechanical force, for example by extrusion, calendering or injection molding, is applied to shape the molten polyethylene. Thus shaping, by extrusion, etc., causes the resultant polyethylene structure to have physical properties which are less than the original properties of the unshaped polyethylene. However, the superior physical properties of this polyethylene are maintained by the porous polyethylene objects prepared by the method described herein.

J. E. Kepple, U.S. Pat. No. 3,308,073, dated Mar. 7, 1967, teaches a method of making porous objects from low molecular weight polyethylene and normally liquid hydrocarbons. In this method 92.5 parts of isoparaffinic hydrocarbon fraction with a boiling range of 420°–475°F and 7.5 parts of polyethylene with a molecular weight of about 290,000 were heated together to above the fusion temperature of the polyethylene. The resulting viscous homogeneous liquid could be poured from the containing beaker. By comparison if 92.5 parts of isoparaffin hydrocarbon fraction with a boiling range of 420°–475°F and 7.5 parts of polyethylene with a molecular weight of about 1,250,000 are heated together to above the fusion temperature of this polyethylene, a gel results which cannot be poured from the containing beaker. Extrusion, calendering or injection molding of this gel causes the polyethylene to undergo shear degradation and the resulting porous object loses much of its superior physical properties.

U.S. Pat. No. 3,607,793, dated Sept. 21, 1971, discloses the preparation of a porous sheet containing a particular polypropylene homopolymer or copolymer. The preparation involves the heating of a mixture of said polypropylene and a particular hydrocarbon to a temperature at which a homogeneous mixture is obtained. And then, the homogeneous mixture is formed into the desired structure, and cooled, and the hydrocarbon extracted.

U.S. Pat. No. 3,536,796, dated Oct. 27, 1970, discloses the preparation of a porous sheet containing an ethylene copolymer, a filler, a petroleum oil, stearic acid and an antioxidant. The preparation involves the extrusion of a melt mixture of the foregoing five components. As is known, extrusion is a shaping operation after the material is melted in the barrel of the extruder. Upon cooling of the shaped article the filler and/or oil is extracted.

U.S. Pat. No. 3,228,895, dated Jan. 11, 1966, discloses a method of making a microporous article from a mixture of a modified polyolefin and a plasticizer. The modified polyolefin is shown as having a measurable melt index whereas present invention is directed towards an ultra high molecular weight polyethylene having no measurable melt index.

U.S. Pat. No. 3,024,208, dated Mar. 6, 1962, discloses a process for the production of a porous polyethylene article. The polyethylene disclosed has a molecular weight ranging from 100,000 to 1,000,000. The process consists of sintering, that is, heating of particles under pressure without the actual melting of the particles.

U.S. Pat. No. 3,336,244, dated Aug. 15, 1967, discloses a porous product prepared by sintering a mixture of a polyolefin, a thermosetting resin and a different thermoplastic resin.

SUMMARY OF THE INVENTION

The present invention provides a method for forming a porous polyethylene object of desired shape having good toughness, high impact strength, excellent abrasion resistance and other superior physical properties. In addition a porous sheet produced by this method has excellent ability to receive permanent impressions. The method comprises establishing a uniform heterogeneous composite of particles of polyethylene having a molecular weight of 1,000,000 and a hydrocarbon forming the heterogeneous composite into an object of the desired shape; heating the object to a temperature above the melting point of the polyethylene and maintaining such temperature until the polyethylene particles have completely fused. The formed structure is cooled and the hydrocarbon removed. The hydrocarbon used to form the composite has specific attributes relating to its viscosity, melting point and absorbability towards the polyethylene; these attributes are defined hereinafter.

DESCRIPTION

Polyethylene with a molecular weight in excess of 1,000,000 has not been extensively used because it cannot be readily processed on conventional processing equipment, e.g., extrusion. This higher molecular weight polyethylene, when molten, has an extremely high viscosity thus requiring large quantities of mechanical work to shape the molten polyethylene. The application of so much mechanical work to this molten polyethylene literally tears the high molecular weight polymer molecule apart. This mechanical tearing apart of the polyethylene molecule has an adverse effect on the physical properties and therefore the performance of the final porous polyethylene product. This mechanical tearing apart of the polyethylene molecule occurs even when a gel of this polyethylene and a hydrocarbon such as wax is shaped by, for example, extrusion.

This invention permits the shaping of the polyethylene with a molecular weight in excess of 1,000,000 and the subsequent making of porous objects without the polyethylene molecule undergoing substantial shear degradation. This shaping can be performed by methods which otherwise cause shear degradation, for example, extrusion, calendering and injection molding. This shaping can also be performed by methods which normally would not cause shear degradation, for example, compression molding or casting.

The weight ratio of the polyethylene to carrier used in this invention can range from 5 to 50 parts by weight of polyethylene and 50 to 95 parts by weight of carrier. A more desirable weight ratio range is from 10 to 40 parts by weight of polyethylene and 60 to 90 parts by weight of carrier.

The polyethylene used in this invention has a molecular weight in excess of 1,000,000. Polyethylene with a molecular weight as high as 6,000,000 is available. Molecular weights herein referred to are determined in the following manner. The reduced viscosity of the polyethylene is determined according to ASTM D1601-61 using tetrahydronaphthalene and a temperature of 135°C. Using the relationship between reduced specific viscosity (reduced viscosity) and molecular weight reported in "Properties and Uses of Very High-Molecular-Weight, High-Density Polyethylene", W. E. Gloor, MODERN PLASTICS, 221, pp. 131–136, Nov. 1961, and the measured reduced viscosity the molecular weight of the polyethylene is determined.

The problem of moving the molten polyethylene defined herein can be indicated by comparison of the rate of extrusion of molten polyethylene through an orifice of a specified length and diameter under prescribed conditions of temperature and pressure (ASTM D1238-65T, Tentative Method of Measuring Flow Rates of Thermoplastics by Extrusion Plastometer). For example, ASTM D1238-65T states that a polyethylene at 125°C (257°F) and under a 325 g. load (Procedure B) had a nominal flow rate of 0.25 g/10 min. Such a flow rate, using Procedure B, is typical of a low molecular weight polyethylene. In contrast, the ultra high molecular weight polyethylene used in the examples herein has no measurable flow rate at 190°C (374°F) and under a 21,600 g. load (Procedure F).

The particle size of the polyethylene used can vary appreciably. For example, a satisfactory porous object is prepared using finely divided polyethylene particles all of which pass through a 100 mesh screen (opening size about 147 microns) 75% of which are retained on a 200 mesh screen (opening size about 74 microns) and 25% of which pass through a 200 mesh screen. Equally satisfactory porous objects are obtained when all the polyethylene particles are capable of passing through a 200 mesh screen. The screen used herein refers to U.S. Sieve Series.

The organic solvent used to extract the hydrocarbon from the homogeneous shaped polyethylene structure can be any normally liquid hydrocarbon that will readily dissolve the carrier without dissolving or affecting the fused polyethylene at extraction temperature.

Preferably the organic solvent has a low boiling point so that it can readily be evaporated from the porous shape. Evaporation of any residual organic solvent, if any, from the object can be accelerated by heating the porous shape to any temperature just below the fusion point of the polyethylene with or without a vacuum. Examples of suitable organic solvents for the hydrocarbon would be hexane, a $C_6$ paraffinic fraction boiling between 60°C and 70°C, heptane, octane, cyclopentane and cycloheptane.

The hydrocarbon used to prepare the heterogeneous composite can be either solid or liquid at room temperature. A preferred liquid hydrocarbon can be one with a molecular weight in excess of 200. One example is a white mineral oil, others are a paraffinic lubricating fraction, or a kerosene. The solid hydrocarbon can be either a petroleum wax or a synthetic wax. A useful petroleum wax can be obtained by any one of the processes described in Chapter 5 of THE CHEMISTRY AND TECHNOLOGY OF WAXES by A. H. Warth, 2nd Edition, and can be any one of the refined or unrefined petroleum waxes described in the same chapter. Synthetic waxes that can be used are described in Chapter 6 of the aforementioned reference.

However the hydrocarbon used to prepare the heterogeneous composite must have certain attributes, these are: (1) a melting point at least 20°F lower than that of said polyethylene; (2) a viscosity at a temperature just above its melting point of not more than 1/10 of that of said polyethylene at a temperature just above its melting point; (3) substantial non-absorbability of the polyethylene by the hydrocarbon at a temperature below the melting point of the polyethylene but substantial absorbability of the polyethylene by the hydrocarbon at a temperature above the melting point of said polyethylene. The hydrocarbon can be also a mixture of two or more of the previously mentioned hydrocarbons.

The aforementioned white mineral oils are substantially free of unsaturated compounds or aromatic radicals, e.g., the phenyl or naphthyl radical. They are substantially non-volatile both at room temperature and under usual molding conditions; i.e., they boil at a temperature of 200°C or higher at 760 millimeters of mercury absolute pressure. They ordinarily possess a viscosity lying in the range of from 10 to 70 centistokes at 100°F.

The preliminary step of the method of the invention involves forming a heterogeneous blend of the polyethylene and the hydrocarbon. For a solid hydrocarbon, such as paraffin wax, this is most conveniently accomplished by charging the hydrocarbon to a suitable mixer, e.g., a sigma blade mixer, equipped with heating means. The wax is heated to a temperature above its melting point, but below the melting point of the yet to be charged polyethylene. After the wax has softened, particles of the solid polyethylene are charged to the mixer. The mass is worked until it is completely mixed while the temperature is held at the level above specified. This heterogeneous blend can be directly fed to a shaping system. Or, a friable powder can be obtained by shutting off the heat to the mixer and maintaining the mixing. For a liquid hydrocarbon, such as white mineral oil, or kerosene, the heterogeneous blend can be obtained by adding the liquid hydrocarbon to a vessel equipped with a stirrer and heating devices. The temperature of the liquid hydrocarbon can be brought up to 20°F to 40°F below the melting point of the yet to be charged polymer. The polyethylene is charged to the vessel and mixing continued until a well mixed composite is obtained. This heterogeneous composite can be transported to shaping equipment where it will be used at the processing conditions specified for this invention.

Air attached to the particles of polyethylene charged to the mxer and/or air entrapped during the mixing step can affect the porosity of the final products. For example, if air is in the heterogeneous composite prepared in the aforementioned preliminary step the air tends to escape during the subsequent processing steps. Any air that does escape, particularly during the final heating step, affects the porosity of the final object. If desirable the preliminary step can be performed under a vacuum to remove any air attached to the finely divided polyethylene power and/or prevent any air from being entrapped during the mixing of the polyethylene and the hydrocarbon. Or, the air can be removed by the application of a vacuum just before, or during, or after the shape is formed.

Next the heterogeneous composite of polyethylene and the hydrocarbon is formed into the desired shape. The desired shape can be obtained by methods that would cause substantial shear degradation if the temperature of the composite is above the melting point of the polyethylene. Examples of such methods are extrusion, injection molding, or calendering. The desired shape can be also obtained by methods that would not normally cause shear degradation if the temperature of the composite is above the melting point of the polyethylene. Examples of such methods are compression molding and casting. This shape could range from a continuous, wide, thin sheet to a high, large diameter cylinder. This shaping is done at a temperature below the melting point of the polyethylene. On the other hand, if the temperature of the composite before shaping was above the melting point of the polyethylene the composite would be an extremely viscous mass, barely movable even under the application of a tremendous force. However, even though it would be possible to shape this molten mass under the application of appreciable force the polyethylene would undergo shear degradation and the resulting object would not have the superior physical properties of the starting high molecular weight polyethylene.

After the forming of the shaped article the temperature of the structure is raised till it is above the melting point of the polyethylene but below the decomposition point of the polyethylene. This elevated temperature is maintained until the polyethylene particles have completely fused. During this heating the desired shape is maintained. While the length of time required to fuse the polyethylene particles depends on the dimensions of the shape, the weight ratio of polyethylene to carrier, and the temperature difference between the heat source and the shape, there is a minimum time necessary to obtain complete fusion. For example, porous sheet prepared with heating periods of 20 seconds have relatively weak tensile strengths whereas sheets with heating periods in excess of 20 seconds have relatively strong tensile strengths. Also, the latter sheets have superior elongation ability.

Once the polyethylene particles fuse, the structure is allowed to cool or is cooled to a temperature below the melting point of the polyethylene. Forced cooling can be accomplished by numerous techniques. Among these are by blowing air past the object or the device holding the object, or contacting the holding device with cold water or some other coolant. Once a temperature is reached which is below the melting point of the polyethylene the object usually has sufficient strength to be handled. If the hydrocarbon used to prepare the composite is a wax which is solid at ambient conditions, the object will have additional strength if the temperature is below the melting point of the wax.

After the object has sufficient strength to be handled, the hydrocarbon is removed by extraction with an organic solvent. This can be done by, for example, immersing the object in the organic solvent. The organic solvent can be at ambient temperature or at a higher temperature, but a temperature above the fusion point of the polyethylene should be avoided. The time required for extraction of the hydrocarbon depends in part on the dimension of the object, the weight ratio of hydrocarbon to polyethylene, and the solubility of the hydrocarbon in the organic solvent and temperature of the organic solvent at time of use. The exact relationship can be determined by simple experimentation. With a thin sheet, white mineral oil is extracted by hexane in a few minutes. If shrinkage and/or distortion during extraction of the hydrocarbon is a problem, methods to prevent these can be used. For example, if the object containing the polyethylene and the hydrocarbon is in the form of a thin sheet, shrinkage and distortion can be minimized by clamping the edges of the sheet onto an open rectangular frame. And then the combination of sheet and frame is immersed in the organic solvent to remove the hydrocarbon. Other techniques are equally suitable.

The hydrocarbon-organic solvent mixture can be treated to separate the hydrocarbon and organic solvent. The separation can be, for example, by distillation or crystallization. The recovered hydrocarbon and organic solvent each can be recycled for reuse in the process if desired.

After the hydrocarbon has been extracted any residual organic solvent remaining in the object can evaporate or be removed by vacuum with or without heat. The time required for this evaporation depends in part on the dimension of the porous object, the porosity, the vapor pressure of the solvent and temperature; the relationship can readily be determined by experimentation.

Following are examples of this invention:

EXAMPLE I

Typical properties of the polyethylene powder used in all these examples (I–XXVI) are:

| | |
|---|---|
| Specific Gravity | 0.940–0.942 |
| Melt Index (ASTM D1238) | nil |
| Crystalline Melting Point | 266–268°F |
| Molecular Weight | 1,250,000 |

A particle size analysis showed that the whole powder passed through 100 mesh (opening size about 147 microns) with 75% retained on 200 mesh (opening size about 74 microns) while 25% through 200 mesh.

The white mineral oil used herein had a specific gravity between 0.88 and 0.90 and SUS viscosity at 100°F between 360 and 390.

To prepare one example of a porous structure by the present invention fifty percent by weight of the polyethylene and 50 percent by weight of the white mineral oil were compounded into a thick paste at room temperature. This paste was spread between glass plates and heated in an oven to a temperature just above the melting point of the polymer. Fusion rapidly occurred and upon cooling a strong self-sustaining sheet was obtained. The mineral oil in the sheet was washed out with normal hexane and residual hexane was evaporated, leaving a porous opaque stiff membrane. This membrane, when typed upon with a typewriter without a ribbon, takes a permanent image. The pressure causes the micro voids to collapse thereby resulting in a negative image composed of sharp translucent lines on an opaque background.

COMPARATIVE EXAMPLES

A portion of the heterogeneous paste prepared in the foregoing Example I was heated to a temperature above the polyethylene's melting point. Attempts to stir the molten homogeneous mixture were unsuccessful. In other words, the mixture was so stiff it was not possible to spread on a glass plate. This comparison indicates the necessity for forming the heterogeneous composite into the desired shape prior to increasing the composite's temperature to above the polymer's melting point.

Also, several attempts to prepare similar sheets from other polymers using the heretoforementioned technique were made without notable success. A medium impact polystyrene powder was treated but significant particle fusion could only be realized on prolonged heating (e.g., 5 minutes). Furthermore the resulting sheet was fragile, while oil removal produced an equally fragile sheet. A polyethylene with a molecular weight of about 300,000 was also treated. After fusion and cooling steps the resulting sheet was butter-like in consistency and could not be handled satisfactorily. Extraction of the mineral oil produced a crumbly solid with no strength. A polypropylene with a molecular weight of about 300,000 was also treated. However, the sheet produced after quenching was too soft and after slow cooling too waxy for further handling.

was about 5000 cps compared to about 155 cps for the mineral oil without the added powder. A typical antioxidant was used at 0.02–0.05 part per total weight of dispersion. The dispersion was vacuum degassed to remove any air within the dispersion.

The dispersion was doctored onto a flat metal surface at the desired thickness using a Gardner knife. A piece of 8 inch × 9 inch × ⅛ inch stainless steel plate was used. This steel plate was placed on a hot plate and the latter's temperature was raised to 350°–400°F or was already at the elevated temperature. This temperature was maintained until the dispersed polyethylene fused.

Fusion was monitored by the sharp change in reflectivity of the surface of the film. This change in reflectivity from glossy to dull is believed to be due to the melting of the particles of the polyethylene. The total heating time varied as shown in the accompanying Table I.

The film was quenched by running cold tap water against the back side of the stainless steel plate immediately after the entire film surface fused. This required at most several seconds. Once cooled the film was in a gel-like condition but possessed sufficient strength to be handled.

This film was then clamped by the edges onto an open rectangular frame to prevent shrinkage and distortion. It was then immersed in hexane at room temperature and removal of the mineral oil occurred rapidly. Immersion times as short as 2–3 minutes were sufficient to remove the oil. The resulting sheet was allowed to dry while clamped within the frame.

The sheet was somewhat limp, compared to a paperboard of comparable thickness. It was extremely white and opaque. The surface of the sheet that had been in contact with the steel plate during the fusion step was relatively smooth and somewhat glossy though white. The upper side had a satin-like appearance and was extremely bright.

Porous sheets of various thicknesses were tested for tensile strength, with results as reported in Table I.

TABLE I

| Run | Gauge: Mils (at Point of Rupture) | Tensile Strength of Porous Ethylene Sheets Heating Time: Seconds (after onset of fusion was observed) | Tensile Strength: p.s.i. | Elongation, % |
|---|---|---|---|---|
| 2 | 3.2 | 20 | 250 | 25 |
| 3 | 6.0 | " | 458 | 98 |
| 4 | 9.7 | " | 330 | 26 |
| 5 | 9.1 | " | 362 | 29 |
| 6 | 15.9 | " | 310 | 200 |
| 7 | 24.2 | " | 347 | 51 |
| 8 | 27.6 | " | 246 | 27 |
| 9 | 7.5 | 140 | 676 | 510 |
| 10 | 11.3 | 160 | 660 | 392 |
| 11 | 11.4 | 125 | 635 | 268 |
| 12 | 18.0* | 140 | >835 | 646 |
| 13 | 26.1* | 145 | >808 | 943 |
| 14 | 27.2 | 135 | 773 | 1141 |

*No rupture occurred; gauge determined in area between machine grips.

EXAMPLES II–XIV

Additional, porous polyethylene sheets were prepared in the following manner. The polyethylene powder described in Example I was dispersed in the aforementioned mineral oil by stirring. The dispersion was moderately stable to gravity separation over a time span of several hours. If separation occurred the powder was easily redispersed by stirring the composite. A typical dispersion consisted of one part by weight of the polyethylene fraction and three parts by weight of mineral oil. The Brookfield viscosity of this composition The foregoing data indicates that complete fusion is necessary to obtain relative high tensile strengths and a superior elongation quality. It is believed that twenty seconds for the aforementioned system was insufficient to obtain complete fusion of the particles.

EXAMPLES XV–XXIV

A series of runs was made to determine base weight-thickness relationship for other sheets prepared by substantially the same method as described for Examples II–XIV. This information is presented in the accompanying Table II.

TABLE II

| Run | Weights of Sheets of Different Thickness and Porosity | |
|---|---|---|
| | Sheet Thickness, mils | Base Weight, lb. 3000 square ft. |
| 15 | 3.8 | 12.5 |
| 16 | 7.7 | 37.0 |
| 17 | 9.2 | 43.9 |
| 18 | 9.3 | 48.3 |
| 19 | 10.0 | 48.3 |
| 20 | 10.0 | 50.1 |
| 21 | 14.0 | 50.8 |
| 22 | 14.0 | 71.9 |
| 23 | 16.0 | 58.3 |
| 24 | 20.0 | 92.8 |

Comparison of sheet thickness and base weight of various sheets reported in Table II indicate the differences in porosity that were obtained by these runs. Thus for example the sheets made during Runs 21 and 22 had the same 14 mils thickness yet one sheet had a base weight of 50.8 lbs. per 3000 sq. ft. compared to the other sheet with a base weight of 71.9 lbs. per 3000 sq. ft.

EXAMPLES XXV–XXVI

These two runs were made to show that another shape, e.g., cylinder, could be made by this invention. A dispersion of 15 parts by weight of polyethylene and 85 parts of white mineral oil was prepared. Two 1-inch inside diameter test tubes were filled to a depth of 8 inches with this dispersion. One test tube was placed in an oven maintained at about 285°F for 35 minutes, the other in an oven maintained at about 390°F for 16 minutes. After the tubes were removed from the ovens they were allowed to cool. The polymer-oil composite was firmly set in the glass tubes. The polymer bodies were loosened by filling the tubes with a n-hexane, which by withdrawing oil from the structure caused the fused polyethylene to shrink. The fused bodies were removed and suspended in n-hexane, which gradually displaced the oil from the pores. The oil drifted away from the bodies, falling in a visible stream into the hexane below. By transferring the bodies to fresh hexane two or three times, all oil was removed. The n-hexane was then evaporated from the remaining porous polyethylene structures.

The cylinder prepared at the lower temperature (285°F) had a density of 0.24 g/cc, 75% of its gross volume was porous and its diameter was 0.74 inch. The cylinder prepared at the higher temperature (390°F) had a density of 0.57 g/cc, 40% of its gross volume was porous and its diameter was 0.52 inch. These results indicated that temperature of fusion has a substantial influence on density, porosity and shrinkage.

Substantially equivalent results, as in the aforementioned examples of this invention will be obtained when:

1. other hydrocarbons, for example, petroleum wax, synthetic wax, paraffinic lubricating fractions, and kerosene are used;
2. other polyethylenes with other molecular weights, for example 2, 3 or 4 million are used;
3. other organic solvents such as xylene and acetane, heptane and ethanol, isopropanol, octane and nonane are used.

The invention claimed is:

1. A method of forming a porous structure comprising:
   A. establishing a uniform heterogeneous composite of 5 to 50 parts by weight of polyethylene having a weight average molecular weight in excess of 1,000,000 in finely divided form and 50 to 95 parts by weight of a hydrocarbon having the following attribute:
      1. a melting point at least 20°F lower than that of the polyethylene;
      2. a viscosity at a temperature just above its melting point of not more than 1/10 of that of the polyethylene at a temperature just above its melting point;
      3. substantial non-absorbability of the polyethylene by the hydrocarbon at a temperature below the melting point of the polyethylene but substantial absorbability of the polyethylene by said hydrocarbon at a temperature above the melting point of the polyethylene;
   B. regulating the temperature of said heterogeneous composite to within a range above the melting point of the hydrocarbon but below the melting point of the polyethylene;
   C. forming said composite into desired shape;
   D. thereafter heating the formed shape to a temperature between the melting point and decomposition point of the polyethylene and maintaining said temperature until the particles have completely fused;
   E. and thereafter removing the hydrocarbon from the cooled, formed structure.

2. Method according to claim 1 wherein complete fusion requires maintaining said temperature for a time in excess of 20 seconds.

3. Method according to claim 1 wherein the establishment of the uniform heterogeneous composite is accomplished under vacuum.

4. Method according to claim 1 wherein the hydrocarbon is removed by extraction with an organic solvent which has essentially no solvent power for said polyethylene at extraction temperature.

5. Method according to claim 1 wherein the hydrocarbon is a liquid hydrocarbon with a molecular weight in excess of 200.

6. Method according to claim 1 wherein the hydrocarbon is a petroleum wax.

7. Method according to claim 2 wherein the establishment of the uniform heterogeneous composite is accomplished under vacuum and wherein the hydrocarbon is removed by extraction with an organic solvent which has essentially no solvent power for said polyethylene at an extraction temperature.

8. Method according to claim 7 wherein the hydrocarbon is a petroleum wax.

9. Method according to claim 7 wherein the hydrocarbon is a liquid hydrocarbon with a molecular weight in excess of 200.

10. Method according to claim 9 wherein the liquid hydrocarbon is a white mineral oil.

* * * * *